(12) United States Patent  
Ibrahim et al.

(10) Patent No.: US 8,127,135 B2
(45) Date of Patent: Feb. 28, 2012

(54) CHANGING OF SHARED ENCRYPTION KEY

(75) Inventors: Wael M. Ibrahim, Houston, TX (US); Lan Wang, Houston, TX (US); Jennifer E. Rios, Houston, TX (US); Valluddin Y. Ali, Houston, TX (US); Manuel Novoa, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1184 days.

(21) Appl. No.: 11/536,443

(22) Filed: Sep. 28, 2006

(65) Prior Publication Data

US 2008/0082824 A1 Apr. 3, 2008

(51) Int. Cl.
*G06F 21/00* (2006.01)
(52) U.S. Cl. ............ 713/171; 713/168; 380/44; 380/45; 380/277; 380/278; 380/259; 380/260; 380/283; 380/284
(58) Field of Classification Search .............. 713/1, 100, 713/168, 171, 164, 169; 380/259, 260, 262, 380/283, 284, 277, 278, 44, 45, 46, 47, 28; 726/5, 6, 7, 18, 19
See application file for complete search history.

(56) References Cited

U.S. PATENT DOCUMENTS 5,491,749 A * 2/1996 Rogaway ...................... 713/171
(Continued)

FOREIGN PATENT DOCUMENTS

EP 1424804 6/2004
(Continued)

OTHER PUBLICATIONS

RSA Laboratories, "3.6.1 What is Diffie-Hellman?", Copyright 2004 RSA Security, 2 pp. [Online] http://www.rsasecurity.com/rsalabs/node.asp?id=2248.

(Continued)

*Primary Examiner* — Eleni Shiferaw
*Assistant Examiner* — Hilary Branske

(57) ABSTRACT

A system comprises a first operating environment and a second operating environment. The first and second operating environments exchange information in encrypted form using a shared encryption key (K3). The first and second operating environments cooperate to change the encryption key K3 using another shared encryption key (K4). The encryption key K4 is changed upon the encryption key K3 being changed.

20 Claims, 5 Drawing Sheets

U.S. PATENT DOCUMENTS

| | | | | |
|---|---|---|---|---|
| 5,515,439 | A * | 5/1996 | Bantz et al. | 713/156 |
| 5,841,864 | A * | 11/1998 | Klayman et al. | 713/171 |
| 7,353,388 | B1 * | 4/2008 | Gilman et al. | 713/168 |
| 7,565,537 | B2 * | 7/2009 | Morais et al. | 713/169 |
| 7,565,553 | B2 * | 7/2009 | Hunter et al. | 713/192 |
| 2001/0002486 | A1 * | 5/2001 | Kocher et al. | 713/171 |
| 2002/0094085 | A1 * | 7/2002 | Roberts | 380/262 |
| 2002/0164025 | A1 * | 11/2002 | Raiz et al. | 380/231 |
| 2003/0229789 | A1 * | 12/2003 | Morais et al. | 713/171 |
| 2004/0005061 | A1 * | 1/2004 | Buer et al. | 380/282 |
| 2004/0039924 | A1 * | 2/2004 | Baldwin et al. | 713/189 |
| 2004/0083393 | A1 * | 4/2004 | Jordan et al. | 713/202 |
| 2004/0117318 | A1 * | 6/2004 | Grawrock | 705/66 |
| 2004/0157584 | A1 * | 8/2004 | Bensimon et al. | 455/411 |
| 2005/0025091 | A1 * | 2/2005 | Patel et al. | 370/328 |
| 2005/0074125 | A1 * | 4/2005 | Chavanne et al. | 380/278 |
| 2005/0111664 | A1 * | 5/2005 | Ritz et al. | 380/255 |
| 2005/0120245 | A1 | 6/2005 | Torisaki et al. | |
| 2005/0232427 | A1 * | 10/2005 | Konersmann | 380/277 |
| 2006/0050869 | A1 * | 3/2006 | Tuvell et al. | 380/28 |
| 2006/0104440 | A1 | 5/2006 | Durand et al. | |
| 2006/0269066 | A1 * | 11/2006 | Whitehead et al. | 380/270 |

FOREIGN PATENT DOCUMENTS

| | | |
|---|---|---|
| JP | 03214834 | 9/1991 |
| WO | WO2005107141 | 11/2005 |

OTHER PUBLICATIONS

Mihir Bellare et al., "Message Authentication using Hash Functions—The HMAC Construction," RSA Laboratories' CryptoBytes, vol. 2, No. 1, Spring 1996, 5 pp.

Bellare M: "Message Authentication Using Hash Functions—The HMAC Construction" Cryptobytes Magazine, XX, XX, vol. 2, No. 1; Jan. 1, 1996; p. 1-5.

EP examination report, dated Jul. 31, 2009, pp. 5.

Beilare, "Message Authentication Using Hash Functions—The HMAC Construction", Cryptobytes Magazine, vol. 2, No. 1, Jan. 1, 1996, pp. 1-5.

CN Office Action dated Jun. 10, 2010, pp. 5.

CN Decision of Rejection, Appln No. 200780043388,1, date of mailing May 25, 2011, 6 p.

Translation of CN Decision of Rejection, Appln No. 200780043388,1, date of mailing May 25, 2011, 14 p.

JP Office Action, Appln No. P2009-530433, date of mailing Oct. 13, 2011, 2 p.

Translation of JP Office Action, Appln No. P2009-530480, date of mailing Oct. 13, 2011, 2 p.

* cited by examiner

CHANGING OF SHARED ENCRYPTION KEY

BACKGROUND

Many computing systems comprise multiple, generally independent operating environments such as an operating system (OS) and a basic input/output system (BIOS). Such operating environments communicate with each other. In at least some instances, unfortunately the communication mechanism between the operating environments is susceptible to being snooped by unauthorized entities such as "viruses."

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
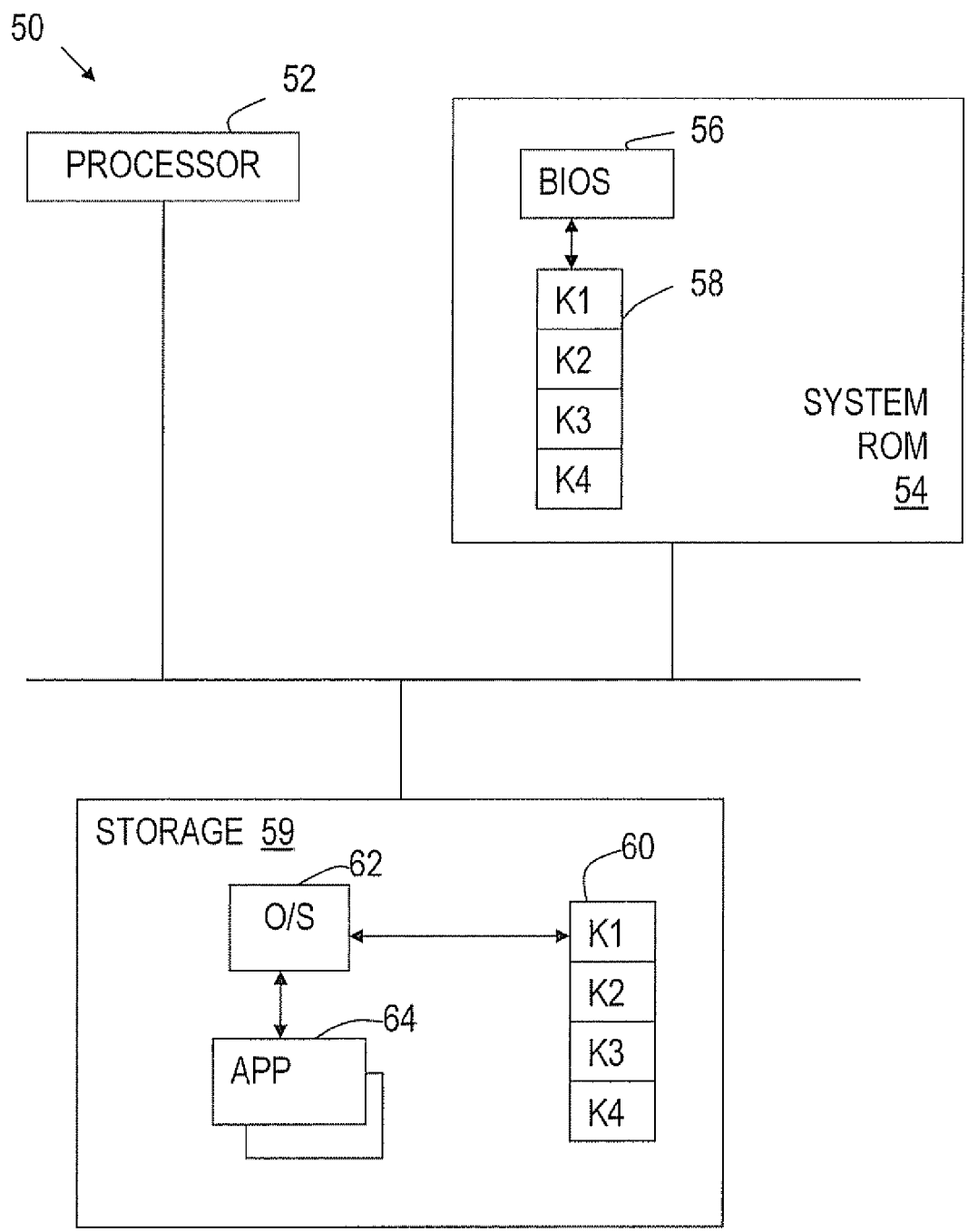
FIG. 1 shows a system in accordance with embodiments of the invention.

FIG. 1 shows an embodiment of a system 50 comprising a processor 52, a system read only memory (ROM) 54 and storage 59. The system ROM 54 stores a basic input/output system (BIOS) 56 that is code which is executable by processor 52. The BIOS 56 comprises power on-self test (POST) that tests and initializes the system 50 during boot-up. BIOS 56 also provides low-level interfaces to various of peripheral components (e.g., floppy disk drive, hard drive, keyboard, etc.) of the system 50.

Storage 59 comprises volatile memory such as random access memory (RAM), non-volatile storage such as ROM, a hard disk drive, etc., or combinations thereof. The storage 59 stores an operating system (OS) 62 which also comprises code that is executed by the processor 52. One or more applications/drivers 64 may be present that run under the OS 62 and are executed by processor 52.

The BIOS 56 and OS 62 comprise two software operating environments that communicate with each other via a secure communication mechanism. The following description is provided in the context of the BIOS 56 and OS 62, but can apply in general to other operating environments. To the extent any of the following actions are attributed to the OS 62, such actions may be performed by the OS itself or one or more of the applications/drivers 64 that run under the OS.

The BIOS 56 and OS 62 communicate with each other by encrypting commands and data to be transferred back and forth therebetween. In accordance with embodiments of the invention, the encryption protocol comprises a symmetrical encryption protocol meaning that the BIOS 56 and OS 62 each uses a copy of the same encryption key. For example, the OS 62 uses the encryption key to encrypt a request to send to the BIOS 56, and the BIOS 56 uses its copy of the same encryption key to decrypt the encrypted request. The "shared" encryption key is used to encrypt information in either direction—from OS 62 to BIOS 56 and vice versa.

It is theoretically possible for an entity (e.g., a virus) to snoop encrypted communications between the BIOS 56 and the OS 62 to determine the encryption key that is used. To reduce the possibility of such an unauthorized entity to snoop the communications between the BIOS 56 and OS 62 to deduce the encryption key, a security mechanism is implemented to update the shared key. The security mechanism causes the BIOS 56 and OS 62 to change their shared key in a secure manner. That is, the manner in which the shared key is updated is itself secure. The shared key update procedure can be scheduled to be performed at predetermined or programmable time periods (e.g., once per hour, once per day, etc.) or upon the occurrence of n number of communications between the BIOS 56 and OS 62 (e.g., with each communication packet or every five communication packets).

Referring again to FIG. 1, system ROM 54 contains storage for various encryption keys 58 labeled as K1, K2, K3 and K4. A copy of keys K1 and K2 are loaded into system ROM 54 and, in accordance with some embodiments of the invention, are not erasable, over-writeable, or otherwise eradicated. Keys K3 and K4 can be erased and overwritten as will be explained below. The K1-K4 keys 58 on the system ROM may be part of the BIOS 56 or may be separate from the BIOS 56. The OS 62 also has access to a set of keys K1-K4 60. In accordance with illustrative embodiments, the keys K1-K4 60 for the OS are identical to the keys K1-K4 58 for the BIOS 56. As for the BIOS keys 58, in some embodiments a copy of keys K1 and K2 for the OS 62 are protected from being overwritten or otherwise eradicated. The keys K3 and K4 for the OS can be erased and overwritten.

The term "key" as used herein (e.g., K3) refers to the value of the key. Thus, the value of K3 can be changed to a new value that will still be referred to as K3.

As shown in FIG. 1, each of the BIOS 56 and OS 62 has access to a shared encryption key for purposes of encrypting information to be exchanged between the BIOS 56 and OS 62. In accordance with embodiments of the invention, the encryption process is symmetrical encryption meaning that the same key value used to encrypt information is also used during the decryption process. For example, the OS 62 uses its copy of shared key K1 to encrypt information (e.g., commands, data) to be sent to the BIOS 56. The BIOS 56 uses its copy of shared key K1 to decrypt the received communication and recover the underlying information. The BIOS 56 can also send encrypted information to the OS 62 and, to that end, BIOS 56 uses key K1 to encrypt such information and OS 62 uses key K1 to decrypt. The OS 62 and BIOS 56 thus exchange information in encrypted form using a shared encryption key (e.g., K1). Shared key K2 is used during the key update procedure shown in the example of FIG. 2.

As discussed above, it is possible to deduce the value of a symmetric encryption key by monitoring the encrypted packets passed back and forth. Thus, encryption key K1 could be deduced by monitoring the encrypted information exchanged between the BIOS 56 and OS 62. In accordance with embodiments of the invention, a mechanism is provided by which the encryption key used to encrypt information between two operating environments (e.g., the BIOS 56 and OS 62) is changed. Further, changing the encryption key is performed in a way that itself is secure so that the new value of the encryption key is not compromised. Shared symmetrical encryption key K2 is used for purposes of changing encryption key K1 in a way that helps to verify that only an authorized entity is attempting to change K1. Upon changing key K1, key K2 is also changed. Further, in accordance with various embodiments of the invention, the current value of key K2 is used only during the process of changing key K1 during which K2 is also changed. That is, during the process of changing K1, key K2 is also set to a new value which is then used the next time key K1 is to be changed. Because the current value of K2 is used to assist in changing K1 one time (although K2 may be used more than once each time K1 is changed), its value cannot reasonably be deduced by unauthorized entities monitoring traffic between the BIOS 56 and the OS 62. In some embodiments, K1 and K2 are changed. In other embodiments, to ensure that the BIOS 56 and OS 62 can communicate with one another even in the event of an error of some sort, keys K1 and K2 remain unchanged; instead, a copy of keys K1 and K2 (discussed herein as keys K3 and K4, respectively) is used to encrypt/decrypt messages and perform the key update process. In the event of an error, the system can revert back to K1 and K2.

In accordance with embodiments of the invention, one of the BIOS 56 and OS 62 requests the other of the BIOS and OS to compute a new encryption key value for K1 and K2. In one embodiment, the OS 62 requests the BIOS 56 to compute new values for K1 and K2. During this process, key K2 is used by the BIOS 56 to verify the OS's request to change the encryption key K1. Further, key K2 is also used by the OS 62 to verify the communication from the BIOS back to the OS with the new value of K1 and K2. Using K2 to verify the communications between the OS 62 and BIOS 56 helps to prevent an unauthorized entity from exchanging a new key pair with either or both of the OS or BIOS. In the embodiments described herein, only those computing environments (e.g., the BIOS 56 and OS 62) that have access to the shared key K2 can effectuate a change in keys K1 and K2.

In accordance with at least some embodiments of the invention, the system 50 is provided to a user of the system with the values of K3 and K4 being set to the values of K1 and K2, respectively, for both the BIOS 56 and OS 62. That is, initially K3 equals K1 and K4 equals K2 for both the BIOS 56 and OS 62. During an install process for system 50, keys K3 and K4 are changed for both the BIOS 56 and OS 62 in accordance with the method described below. From that point on, encryption between the BIOS 56 and OS 62 uses key K3, and key K4 is used to change key K3 with a resulting change to K4 as well.

In some embodiments, keys K1 and K2 for both the BIOS 56 and OS 62 are not erasable thereby providing the system 50 the ability to revert back to a known functional set of keys (K1 and K2) as desired or needed. For example, if storage 59 malfunctions and is replaced, the replacement hard drive will have the original values for K1 and K2 with keys K3 and K4 mirroring keys K1 and K2. Keys K3 and K4 on system ROM 54 can also be set back to the initial values of K1 and K2.

Figure 2:
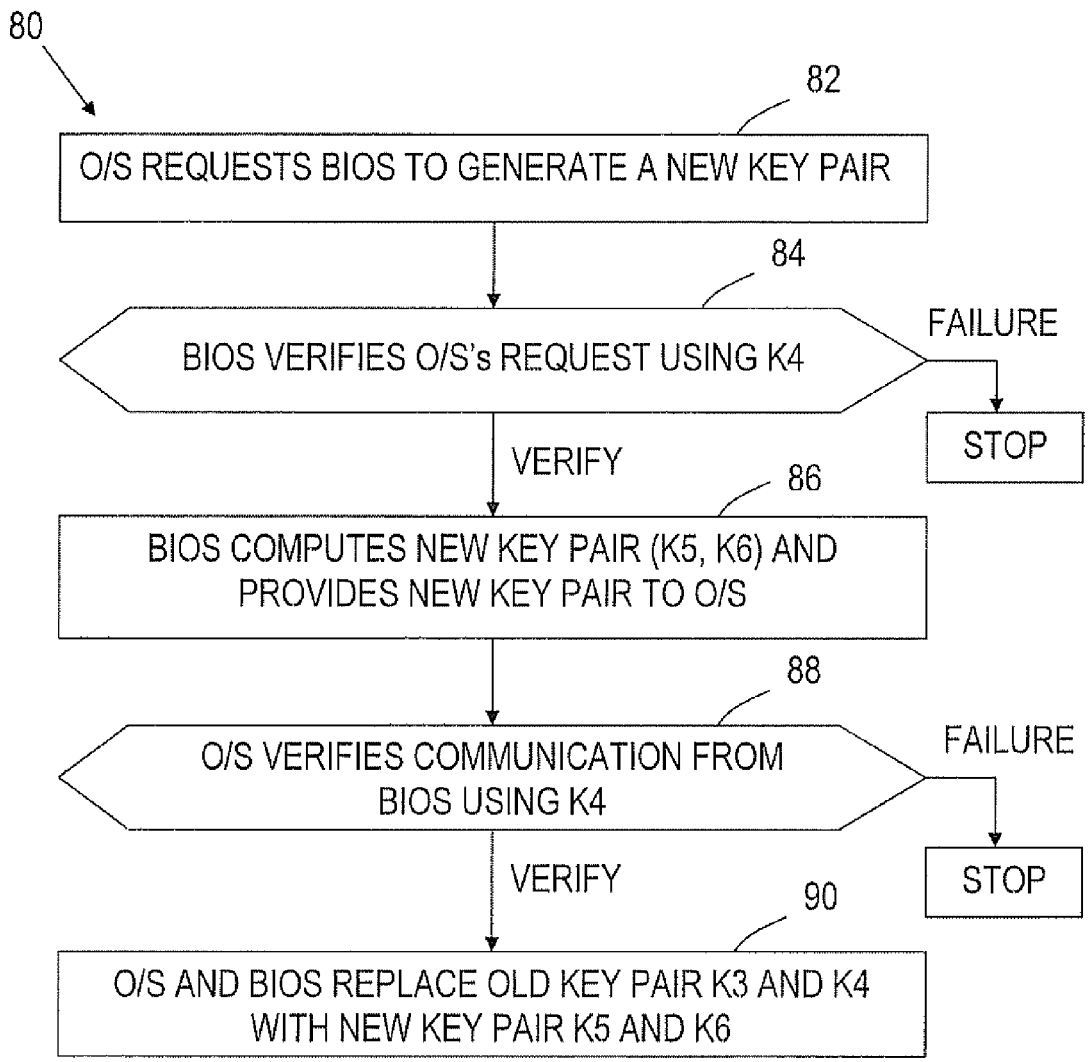
FIG. 2 shows a method of changing keys shared between at least two operating environments in accordance with embodiments of the invention.

Referring to FIG. 2, an example of a key change process 80 is shown comprising actions 82-90. The process 80 of FIG. 2 describes the BIOS 56 computing new values for K1 and K2 at the request of the OS 62. In other embodiments, the roles of the BIOS 56 and OS 62 are reversed with the BIOS 56 requesting the key update and the OS 62 computing the new key values.

At 82, the OS 62 requests the BIOS 56 to generate a replacement set of key values for shared keys K3 and K4. At 84, the BIOS 56, through use of K4, verifies the OS's request. If the BIOS 56 successfully verifies the OS's request, then at 86 the BIOS computes a new set of encryption key values (K5 and K6) and provides the new key values K5 and K6 to the OS 62. The key values K5 and K6 are transient in nature meaning that they are only used, in at least some embodiments, for purposes of changing the values of K3 and K4. If the BIOS 56 fails to verify the OS's request, then the process stops or performs another suitable action (e.g., annunciate an alert).

Referring still to FIG. 2, at 88, through the use again of K4, the OS 62 verifies the communication from the BIOS 56 containing the new encryption key set (K5, K6). If the OS 62 successfully verifies the BIOS' communication, then at 90 the OS replaces the OS's copy of the K3 and K4 keys with the new keys K5 and K6. That is, K5 is used to overwrite K3 and K6 is used to overwrite K4. A message is sent by the OS to the BIOS that the OS has accepted the new keys and the BIOS then also replaces its copy of the K3 and K4 keys with the value of the new keys K5 and K6.

Figure 3A:
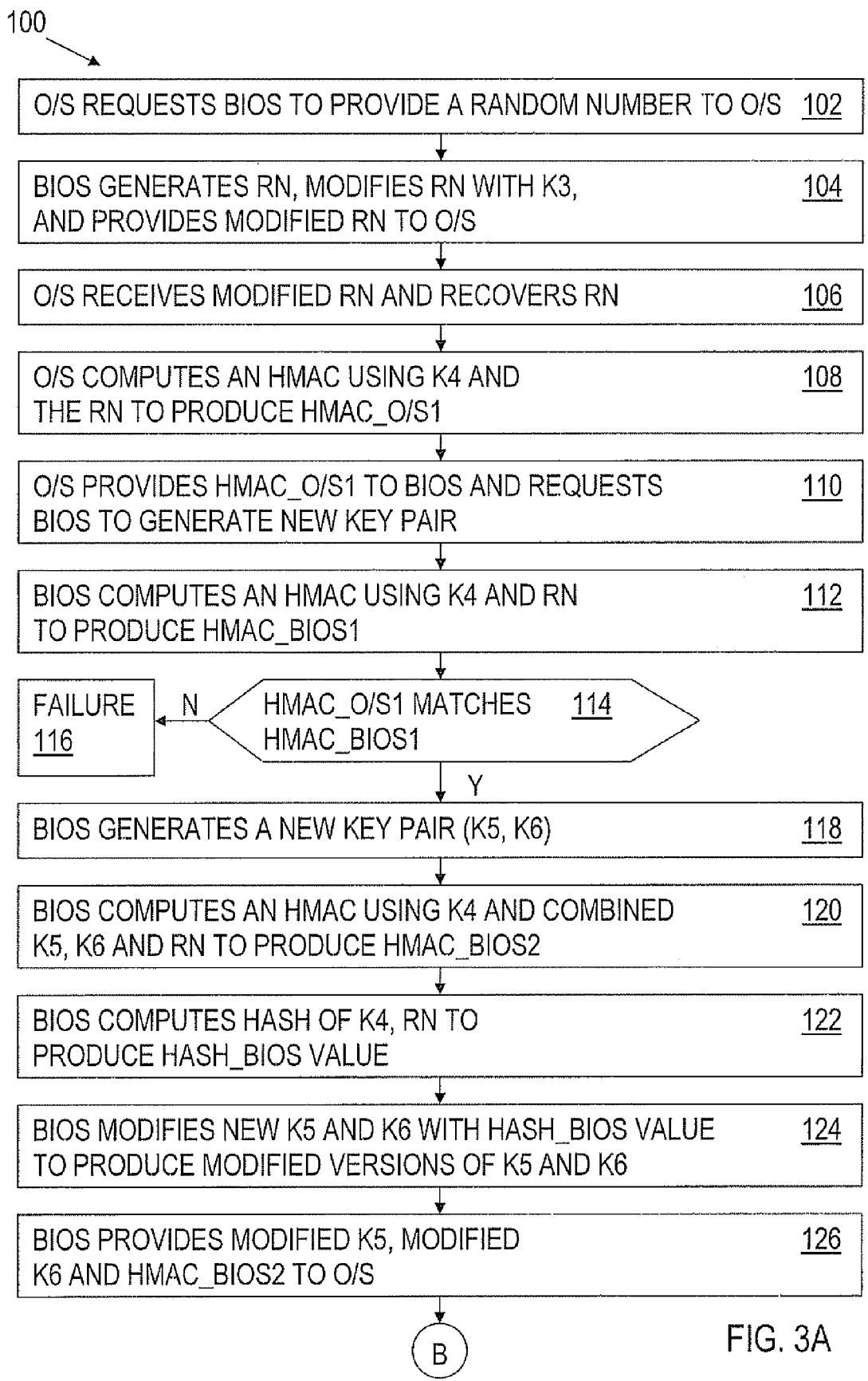
FIGS. 3A and 3B show another illustrative method of changing shared keys.
Figure 3B:
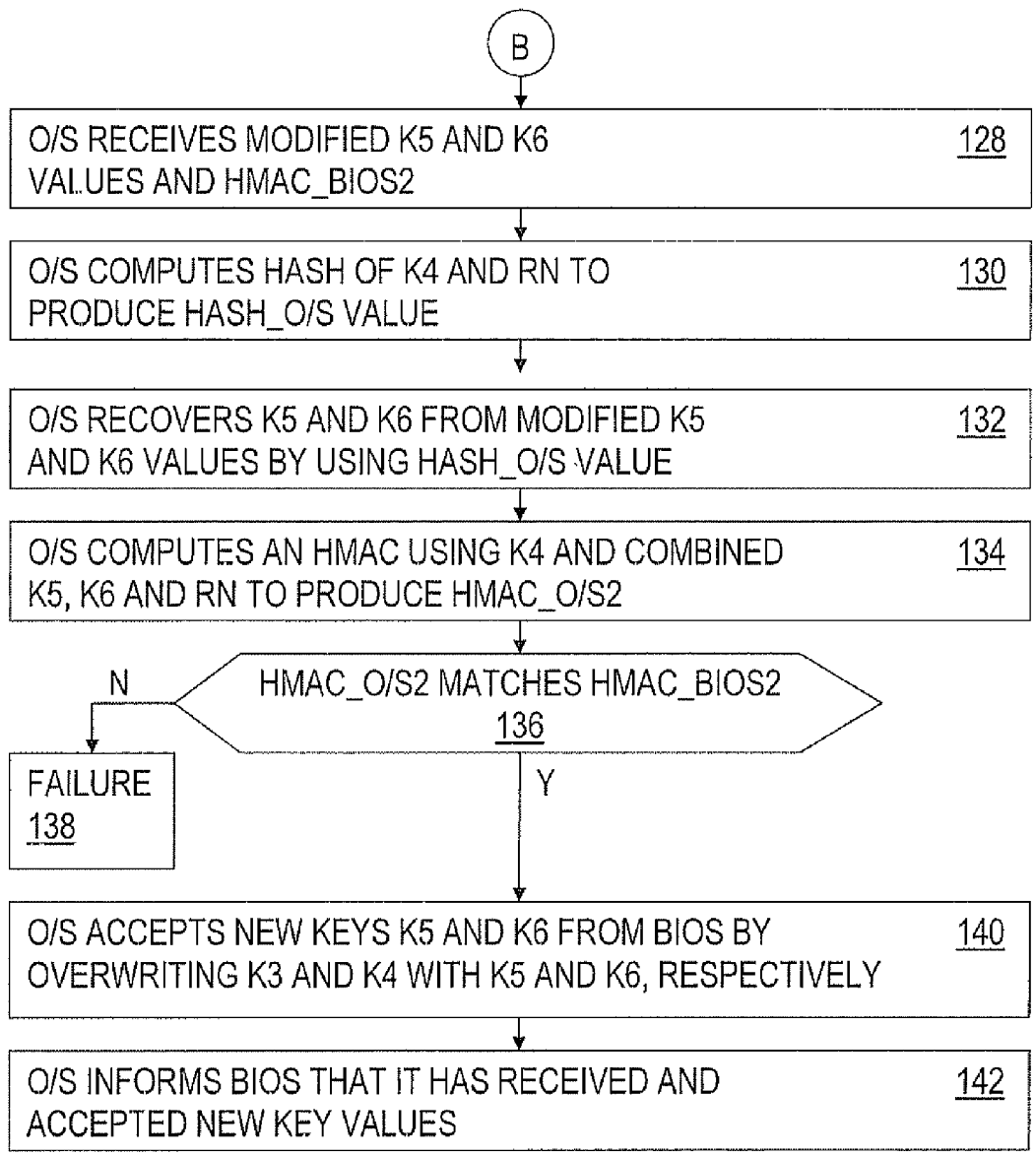

The key change process 100 of FIGS. 3A and 3b explains in more detail some of the actions of FIG. 2. At 102, the OS 62 requests the BIOS 56 to provide a random number to the OS. The term "random number" (RN) comprises a number that is sufficiently random to be usable in conjunction with the embodiments described herein. Thus, the random number need not be a mathematically truly random number. At 104, the BIOS 56 generates a random number, modifies the random number using key K3, and provides the modified random number to the OS 62. Generating the random number can be via any suitable technique such as by sampling an analog parameter (e.g., heat, noise, etc.) and using the sample to generate the random number. In at least one embodiment, the modification to the random number comprises performing an exclusive-OR operation in which the random number is exclusive-ORed with K3. At 106, the OS 62 receives the modified random number and recovers the original random number. In the example in which the random number was exclusive-ORed with K3 by BIOS 56, the OS 62 recovers the random number by exclusive-ORing the modified random number and the OS's copy of K3.

At 108, the OS 62 computes a Hash function-based Message Authentication Code (HMAC) using K4 and the random number recovered 106 to produce an output value, HMAC_OS1. An HMAC is usable to verify the authenticity of a source entity that sends a communication to a destination entity. Other mechanisms besides HMAC are possible and within the scope of the disclosure. At 110, the OS 62 provides the HMAC_OS1 value to the BIOS 56 and requests the BIOS to generate a new set of keys to replace shared keys K3 and K4. Before the BIOS 56 generates the new key values, the BIOS verifies that the request is from an authorized source (i.e., OS 62). The BIOS performs this verification by computing its own HMAC (called HMAC_BIOS1) at 112 using the random number the BIOS generated at 104 and also using the BIOS' copy of K4, which will be the same values used by the OS 62 to generate the HMAC_OS1 value. Accordingly, the HMAC values computed by the OS 62 and the BIOS 56 should match. The HMAC values will not match, however, if an unauthorized entity provided an HMAC value to the BIOS because such unauthorized entity will not have access to the correct values of K4 and/or the random number and thus will have computed a mismatching HMAC value.

At 114, the BIOS 56 compares the HMAC_OS1 and HMAC_BIOS1 values to determine if the values match. If the values do not match, the process fails and stops at 116. An alert or other suitable response can be performed in this situation as desired. If, however, the HMAC_OS1 and HMAC_BIOS1 values match, the method continues at 118 at which the BIOS generates a new key pair, K5 and K6. Such keys can be computed in accordance with any suitable technique.

At 120, the BIOS computes another HMAC value, this time using the BIOS' copy of K4 and another value that is the combination of K5, K6, and the random number generated at 104. The resulting HMAC value at 120 is called HMAC_BIOS2 and, as explained below, will be used by the OS 62 to verify the new key values K5 and K6 are transmitted to the OS by an authorized source (i.e., the BIOS 56). The values of K5, K6, and the random number are combined together, in at least one embodiment, by concatenating such values together. Other techniques for combining K5, K6 and the random are possible as well and within the scope of this disclosure.

Referring still to FIG. 3A, at 122, the BIOS computes a hash of K4 and the random number generated at 104 to produce a value called Hash_BIOS. Any suitable hash function can be used in this regard. At 124, the BIOS 56 modifies the newly computed keys K5 and K6 using the Hash_BIOS value to produce modified versions of K5 and K6. As such, K5 is modified using Hash_BIOS and K6 is also modified using Hash_BIOS. In at least some embodiments, the modification to the K5 and K6 values comprises exclusive-ORing each of the K5 and K6 values with the Hash_BIOS value. At 126, the BIOS 56 provides the modified K5, modified K6 and the HMAC_BIOS2 values to the OS 62.

At 128 (FIG. 3B), the OS 62 receives the modified K5 and K6 values as well as the HMAC_BIOS2 value. At 130, the OS 62 computes a hash (using the same hash function as was used by the BIOS at 122) of the OS' copy of K4 and the random number provided to the OS by the BIOS at 104. The hash value computed at 130 is called Hash_OS. At 132, the OS 62 recovers the original versions of K5 and K6 from the modified versions of K5 and K6 by using the hash computed at 130. In embodiments in which K5 and K6 were modified by exclusive-ORing K5 and K6 with the Hash_BIOS value, the recovery operation is performed by exclusive ORing the modified versions of K5 and K6 with Hash_OS.

At 134, the OS computes an HMAC value using K4 and a combination of K5, K6 (recovered in 132) and the random number from 104. In at least some embodiments, the values of K5, K6 and the random number are combined together in 134 in the same way as such values were combined together in 120 (e.g., concatenation). The resulting HMAC value from 134 is called HMAC_OS2. The OS 62 compares at 136 HMAC_OS2 with HMAC_BIOS2 to verify that the source of the new keys K5 and K6 is an authorized entity (e.g., BIOS 56). If the HMAC values do not match in 136, then the key update process terminates in failure at 138. Otherwise, at 140 the OS accepts the new keys K5 and K6 from BIOS 56 by using K5 and K6 to overwrite K3 and K4, respectively. At 142, the OS 62 informs the BIOS 56 that the OS has received and accepted the new key values K5 and K6. This acknowledgment causes the BIOS 56 to use its copy of K5 and K6 to overwrite its copy of K3 and K4, thereby replacing the previous values of K3 and K4 with the values of K5 and K6.

Figure 4:
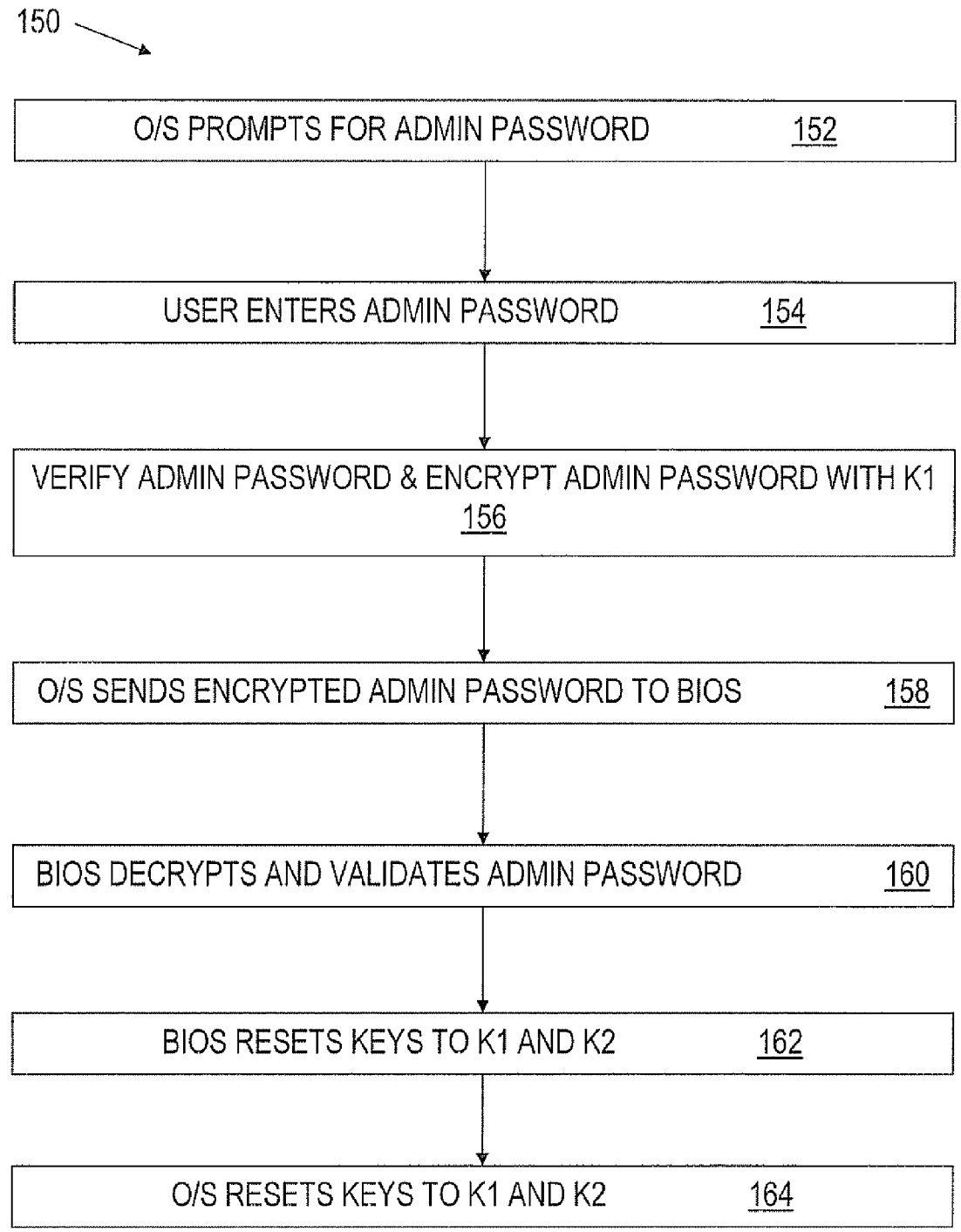
FIG. 4 shows a method of resetting keys shared between at least two operating environments in accordance with embodiments of the invention.

In addition to being able to update the shared keys K3 and K4 used between the BIOS 56 and OS 62, the security mechanism of the disclosed embodiments also permits a reset to occur by which the BIOS 56 and OS 62 reset their shared keys to a prior known set of keys, K1 and K2 so that keys K1 and K2 can be used for encryption/decryption and key update purposes. FIG. 4 provides an illustrative method 150 depicting this process. At 152, the OS 62 prompts the user to enter an administration password, which the user does at 154. At 156, the administration password is verified and then encrypted with key K1. At 158, the OS sends the encrypted administration password to the BIOS 56 which then decrypts and validates the encrypted password (160). The BIOS 56 then resets to keys K1 and K2 (162). This reset operation is performed in some embodiments using the values of K1 and K2 to overwrite the values of K3 and K4 in storage 66. Similarly, the OS resets to keys K1 and K2 by, for example, using the OS' values of K1 and K2 to overwrite the OS' values of K3 and K4 in storage 58 (164).

In accordance with at least some of the embodiments of the invention, no two systems will have the same Kodd and Keven. Thus, even if an attacker gains access to the key pair on one system, such knowledge will be of no use to attack other systems thereby protecting against a global attack.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a hardware processor to execute a first operating environment and a second operating environment;
wherein said first and second operating environments exchange information in encrypted form using a shared encryption key (K3);
wherein said first and second operating environments exchange messages to change said encryption key K3 based on the occurrence of a predetermined number of communications between said first and second operating environments, said messages are encrypted using another shared encryption key (K4), said encryption key K4 being changed upon said encryption key K3 being changed;
wherein each of said first and second operating environments is configured to initiate a communication with the other of said first and second operating environments to change said encryption key K3 and said encryption key K4; and
wherein said first operating environment comprises one of an operating system (OS) and a basic input/output system (BIOS) and the second operating environment comprises the other of said OS and BIOS.

2. The system of claim 1 wherein said encryption key K4 is not used other than while changing said encryption key K3.

3. The system of claim 1 wherein said encryption key K4 is used by one of said first and second operating environments to verify a communication by the other of said first and second operating environments regarding generating a new value for said encryption key K3.

4. The system of claim 1 wherein one of the first and second operating environments submits a Hash function-based Message Authentication Code (HMAC) value to the other of said first and second operating environments, said HMAC value based on said encryption key K4.

5. The system of claim 4 wherein said other of said first and second operating environments performs an HMAC operation using encryption key K4 to verify a communication from one of the first and second operating environments regarding generating a new value for said encryption key K3.

6. The system of claim 1 wherein said first operating environment receives a random number from said second operating environment and performs an HMAC operation using the random number and the shared encryption key K4.

7. The system of claim 1 wherein one of said first and second operating environments generates a new encryption key pair K5 and K6 to be provided to the other of said first and second operating environments to replace said shared encryption keys K3 and K4.

8. The system of claim 7 wherein both of said first and second operating environments replace their shared encryption keys K3 and K4 with values of the new encryption key pair K5 and K6.

9. The system of claim 1 wherein further comprising a shared encryption key pair K1 and K2 for use by said first and second operating environments, wherein said shared encryption key pair K1 and K2 is not erasable, and wherein K1 is usable to encrypt said information exchanged between the first and second operating environments and a value of K2 is usable to generate a new value for K3.

10. The system of claim 9 wherein said first operating environment provides a reset command to said second operating environment to cause said second operating environment to use said key pair K1 and K2 instead of K3 and K4.

11. The system of claim 10 wherein, upon providing said reset command, said first operating environment also uses said key pair K1 and K2 instead of K3 and K4.

12. A method, comprising:
sending, by a first operating environment executed on a first processor, at a predetermined interval, a request to a second operating environment executed on the first processor or another processor to generate a new value for an encryption key (K3) that is shared between the first and second operating environments, wherein the request is encrypted using another shared encryption key (K4);
using, by said second operating environment, the shared encryption key K4 to verify the first operating environment's request;
generating, by said second operating environment, the new value for K3 and generating a new value for K4;
providing, by the second operating environment, the new K3 and K4 values to the first operating environment; and
using, by said first operating environment, said new values of K3 and K4 to replace old values of K3 and K4;
wherein said first operating environment comprises one of an operating system (OS) and a basic input/output system (BIOS) and the second operating environment comprises the other of said OS and BIOS.

13. The method of claim 12 further comprising using, by said second operating environment, said new values of K3 and K4 to replace old values of K3 and K4.

14. The method of claim 12 further comprising using, by said first operating environment, K4 to verify the new K3 value provided by the second operating environment.

15. The method of claim 12 wherein using, by said second operating environment, K4 to verify the first operating environment's request comprises computing, by said second operating environment, a hash function-based message authentication code.

16. The method of claim 15 wherein computing, by said second operating environment, a hash function-based message authentication code comprises computing, by said second operating environment, a hash function-based message authentication code based on K4.

17. The method of claim 15 wherein computing, by said second operating environment, a hash function-based message authentication code comprises computing, by said second operating environment, a hash function-based message authentication code based on K4 and a random number.

18. The method of claim 12 further comprising resetting said values of K3 and K4 to predetermined known values.

19. The method of claim 12 wherein requesting at a predetermined interval comprises requesting at a predetermined interval of time.

20. The method of claim 12 wherein requesting at a predetermined interval comprises requesting upon the occurrence of a predetermined number of communications between said first and second operating environments.

* * * * *